(12) United States Patent
Wong et al.

(10) Patent No.: US 12,190,172 B2
(45) Date of Patent: Jan. 7, 2025

(54) CARBON FOOTPRINT-BASED CONTROL OF CLOUD RESOURCE CONSUMPTION

(71) Applicant: KYNDRYL, INC., New York, NY (US)

(72) Inventors: Kim Poh Wong, Singapore (SG); Firas Bouz, Singapore (SG); Seema Nagar, Bangalore (IN); Pramod Vadayadiyil Raveendran, Machiplavu (IN)

(73) Assignee: Kyndryl, Inc., New York, NY (US)

( * ) Notice: Subject to any disclaimer, the term of this patent is extended or adjusted under 35 U.S.C. 154(b) by 436 days.

(21) Appl. No.: 17/513,992

(22) Filed: Oct. 29, 2021

(65) Prior Publication Data

US 2023/0138727 A1 May 4, 2023

(51) Int. Cl.
*G06F 9/50* (2006.01)
*G06Q 30/018* (2023.01)

(52) U.S. Cl.
CPC ............ *G06F 9/5088* (2013.01); *G06F 9/505* (2013.01); *G06F 9/5072* (2013.01); *G06F 9/5094* (2013.01); *G06Q 30/018* (2013.01); *G06F 2209/501* (2013.01); *G06F 2209/5015* (2013.01); *G06F 2209/5019* (2013.01); *G06F 2209/504* (2013.01); *G06F 2209/506* (2013.01)

(58) Field of Classification Search
None
See application file for complete search history.

(56) References Cited

U.S. PATENT DOCUMENTS

| 8,244,559 B2 | 8/2012 | Horvitz |
| 8,392,574 B1 * | 3/2013 | Shah ................... G06F 9/5061 709/225 |

(Continued)

FOREIGN PATENT DOCUMENTS

| KR | 101544482 B1 | 8/2015 |

OTHER PUBLICATIONS

Luanin, Dražen. "Energy efficient cloud control and pricing in geographically distributed data centers." arXiv preprint arXiv:1809.05853 (2018). (Year: 2018).*

(Continued)

*Primary Examiner* — Sara Grace Brown
(74) *Attorney, Agent, or Firm* — CANTOR COLBURN LLP; Dan Housley

(57) ABSTRACT

An approach is provided for determining a carbon footprint-based consumption of cloud resources. Cloud resource requirements and a carbon footprint cap of a workload of a cloud consumer are received. The requirements and cap are based on a sustainability target, published by the cloud consumer, and subscribed by cloud service providers. A list of cloud resources that satisfy the requirements are sent. Carbon emission values of the cloud resources at different load levels of the workload are sent. Based on a service level agreement requirement, a criticality level, and a peak load duration of the workload, and previous success rates of satisfying cloud resource requirements by cloud service providers, an optimized configuration of cloud resource(s) and cloud service provider(s) is selected. The cloud resource(s) are selected from the list and have a carbon footprint that does not exceed the cap at a given load level.

17 Claims, 9 Drawing Sheets

(56) References Cited

U.S. PATENT DOCUMENTS

| | | | | |
|---|---|---|---|---|
| 2012/0007730 | A1* | 1/2012 | Vecht-Lifshitz | B60S 5/046 340/442 |
| 2012/0179824 | A1* | 7/2012 | Jackson | H04L 47/827 709/226 |
| 2012/0311154 | A1* | 12/2012 | Morgan | G06F 9/5072 709/226 |
| 2016/0321572 | A9* | 11/2016 | Martinez | H04L 67/10 |
| 2017/0324813 | A1* | 11/2017 | Jain | G06F 9/5016 |
| 2019/0303987 | A1* | 10/2019 | Ignatius | G06Q 30/0613 |
| 2020/0027096 | A1* | 1/2020 | Cooner | G06Q 40/04 |
| 2020/0236169 | A1* | 7/2020 | Vaddi | H04L 67/1012 |
| 2020/0351337 | A1* | 11/2020 | Calmon | G06F 9/45558 |
| 2021/0373973 | A1* | 12/2021 | Ekins | G06F 9/5088 |
| 2022/0156661 | A1* | 5/2022 | Xu | H04L 41/0826 |
| 2022/0229707 | A1* | 7/2022 | Lange | G06F 9/5083 |
| 2022/0398095 | A1* | 12/2022 | Weldemariam | G06F 8/76 |
| 2023/0121250 | A1* | 4/2023 | Reineke | G06F 9/5094 705/7.37 |

OTHER PUBLICATIONS

Amazon; Carbon Footprint; https://sustainability.aboutamazon.com/environment/sustainable-operations/carbon-footprint.

Anonymous; Dynamic Bidding and Negotiation System for Cloud Resources; IP.com; IPCOM000260555D; Dec. 5, 2019; 4 pages.

Garg, Saurabh et al.; Green Cloud Framework For Improving Carbon Efficiency of Clouds; Euro-Par 2011 Parallel Processing—17th Conference, Euro-Par 2011; Aug. 29-Sep. 2, 2011; 13 pages.

Hulkury, Mohammad Naiim et al.; Integrated Green Cloud Computing Architecture; 2012 International Conference on Advanced Computer Science Applications and Technologies; Nov. 26-28, 2012; 6 pages.

Jena, Soumya et al.; Minimizing CO2 Emissions on Cloud Data Centers; International Journal of Scientific & Engineering Research, vol. 5, Issue 4; Apr. 2014; 5 pages.

Khosravi, Atefeh et al.; Energy and Carbon Footprint-Aware Management of Geo-Distributed Cloud Data Centers: A Taxonomy, State of the Art, and Future Directions; Chapter in book: Advancing Cloud Database Systems and Capacity Planning with Dynamic Applications; Jan. 2017; pp. 27-46.

Lindberg, Julia et al.; A Guide to Reducing Carbon Emissions through Data Center Geographical Load Shifting; https://arxiv.org/pdf/2105.09120.pdf; May 19, 2021; 8 pages.

Mell, Peter et al.; "The NIST Definition of Cloud Computing;" National Institute of Standards and Technology; Special Publication 800-145; Sep. 2011; 7 pages.

Mytton, David; Carbon emissions aware cloud compute; https://davidmytton.blog/carbon-emissions-aware-cloud-compute/; Apr. 27, 2020; 9 pages.

Smith, Brad; Microsoft will be carbon negative by 2030; https://blogs.microsoft.com/blog/2020/01/16/microsoft-will-be-carbon-negative-by-2030/; Jan. 16, 2020; 13 pages.

Thakur, Sanjeev; Towards Green Cloud Computing: Impact of carbon footprint on environment; 2016 6th International Conference—Cloud System and Big Data Engineering (Confluence); Jan. 14-15, 2016; 5 pages.

* cited by examiner

CARBON FOOTPRINT-BASED CONTROL OF CLOUD RESOURCE CONSUMPTION

BACKGROUND

The present invention relates to managing cloud resources, and more particularly to controlling cloud resource usage based on carbon emission.

Industries are advocating for greener data centers and are targeting a reduced carbon footprint as part of their corporate social responsibility. Companies are working towards green computer environments and a reduced carbon footprint while executing their business applications. Since cloud companies do not provide carbon footprint details of cloud resources, companies using the cloud resources do not know the carbon footprint and the impact on sustainable environment caused by processing their business logic, applications, and workload.

SUMMARY

In one embodiment, the present invention provides a computer system that includes a central processing unit (CPU), a memory coupled to the CPU, and one or more computer readable storage media coupled to the CPU. The one or more computer readable storage media collectively contain instructions that are executed by the CPU via the memory to implement a method of determining a carbon footprint-based consumption of cloud resources. The method includes the computer system receiving requirements of cloud resources and a carbon footprint cap of a workload of a cloud consumer organization. The requirements of the cloud resources and the carbon footprint cap are based on a sustainability target of the cloud consumer organization, published by the cloud consumer organization to a publish-subscribe platform, a multi-cloud management platform, or a hybrid cloud brokerage platform, and subscribed by cloud service providers. The method further includes in response to the receiving the requirements of the cloud resources and the carbon footprint cap, the computer system sending a list of cloud resources that satisfy the requirements of the cloud resources and sending carbon emission values of the cloud resources in the list at different load levels of the workload. The method further includes the computer system receiving a service level agreement (SLA) requirement of the workload, a criticality level of the workload, a peak load duration of the workload, and previous success rates of cloud service providers satisfying cloud resource requirements for the cloud consumer organization. The method further includes based on the SLA requirement, the criticality level, the peak load duration, and the previous success rates, the computer system selecting an optimized configuration of one or more cloud resources and one or more cloud service providers providing the one or more cloud resources for the workload. The one or more cloud resources are selected from the list of cloud resources and have a carbon footprint that does not exceed the carbon footprint cap at a given load level.

A computer program product and a method corresponding to the above-summarized computer system are also described herein.

DETAILED DESCRIPTION

Overview

Figure 1:
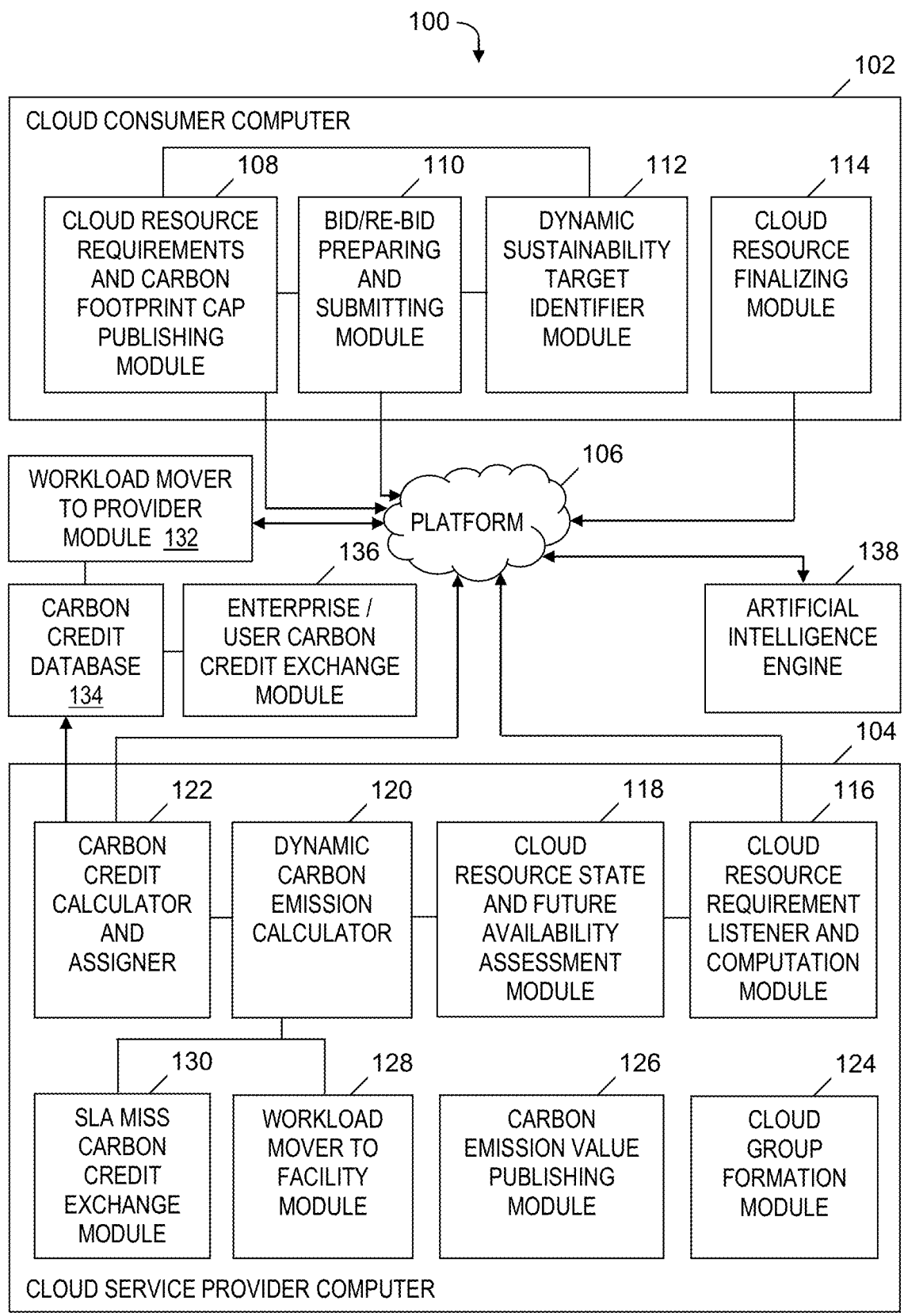
FIG. 1 is a block diagram of a system for carbon footprint-based control of cloud resource consumption, in accordance with embodiments of the present invention.

Regarding carbon emission related to cloud resources used by an organization, leaving accountability solely with the cloud service provider means that the organization is not fulfilling its social responsibility and there is no environmental benefit. Every organization who uses cloud resources should be held responsible for respective carbon emissions and should control the cloud resource usage (or select appropriate greener resources) as part of executing their business applications.

Embodiments of the present invention address the aforementioned unique challenges related cloud resource management by shifting the accountability of carbon emission to the individual organizations who are using the cloud resources. In one embodiment, a cloud resource consumption management system utilizes a publish/subscribe (i.e., pub-sub) system where cloud consumer organizations post their cloud resource requirements together with an affordable carbon footprint cap measured in CO2e units, which is based on the organizations' sustainability targets. The posted cloud resource requirements are subscribed by cloud service providers, which return respective lists of cloud resources meeting the requirements (or the nearest match by trading off with other parameters) together with the carbon footprint of each of the cloud resources at different workload levels. The system selects an optimized greener configuration (or a combination of configurations from multiple cloud service providers) by considering workload service level agreement (SLA) requirements, criticality level of the workload or application, peak load duration, and previous success rates with respective cloud service providers.

In one embodiment, the cloud resource consumption management system provides decision inputs or recommendations to move an organization's workload dynamically to a different cloud service provider or to another facility of the current cloud service provider in response to a change in a carbon emission value, while keeping the organization within its carbon footprint cap. In one embodiment, in response to a negative variation (or a predication of a negative variation) in meeting an agreed upon targeted carbon emission value, the cloud resource consumption management system creates automatic bids to the pub-sub system to meet sustainability targets at an optimal cost.

In one embodiment, the cloud resource consumption management system allows a first cloud resource consumer to trade-off with a second cloud resource consumer who is in custody of a greener cloud resource by generating a bid for the greener cloud resource for a specific amount of time during which the greener cloud resource is used by the first cloud resource consumer to process a large workload (i.e., a workload that exceeds a predetermined threshold workload amount). In response to completing the processing of the large workload, the system automatically returns the cloud resource to the second cloud resource consumer.

In one embodiment, the cloud resource consumption management system enables a formation of a team of cloud service providers at a brokerage platform level or a multi-cloud management platform level. A single cloud service provider in a team serves a request by a consumer for cloud resources (even if the single cloud service provider is not in custody of all the requested cloud resources) by working with other cloud service providers in the team based on service provider level agreements and/or discounts, and by placing software-as-a-service (SaaS) kind of applications on suitable cloud service providers to ensure a decrease in the carbon footprint.

In one embodiment, the cloud resource consumption management system tracks credits earned by different consumers by comparing the carbon emission values of workloads before moving to a target environment with carbon emission values of the workloads after the move to the target environment over a period of time and assigning credit points based on the aforementioned comparison. The pub-sub system provides a mechanism to exchange these credits with other registered consumers who fail to meet carbon emission targets. The cloud service provider may provide the credits to cloud users who fail to meet (i) a service level agreement (SLA) target relative to carbon emissions or (ii) an agreed upon carbon footprint cap.

System for Carbon Footprint-Based Control of Cloud Resource Consumption

FIG. 1 is a block diagram of a system for carbon footprint-based control of cloud resource consumption, in accordance with embodiments of the present invention. A carbon footprint-based control of cloud resource consumption system 100 includes a cloud consumer computer 102 operated by a cloud consumer and a cloud service provider computer 104 operated by a cloud service provider. Cloud consumer computer 102 and cloud service provider computer 104 are operatively coupled to a platform 106 via one or more computer networks (not shown). In one embodiment, platform 106 is a publish-subscribe platform that sets up a publish-subscribe portal. In another embodiment, platform 106 is a multi-cloud management platform. In another embodiment, platform 106 is a hybrid cloud brokerage platform.

In one embodiment, one or more additional cloud consumer computers (not shown) are in communication with platform 106 and have functionalities that match the functionalities of cloud consumer computer 102. In one embodiment, one or more additional cloud service provider computers (not shown) are in communication with platform 106 via one or more computer networks and have functionalities that match the functionalities of cloud service provider computer 104.

Cloud consumer computer 102 includes and executes a cloud resource requirements and carbon footprint cap publishing module 108, a bid/re-bid preparing and submitting module 110, a dynamic sustainability target identifier module 112, and a cloud resource finalizing module 114.

Cloud service provider computer 104 includes and executes a cloud resource requirement listener and computation module 116, a cloud resource state and future availability assessment module 118, a dynamic carbon emission calculator 120, a carbon credit calculator and assigner 122, a cloud group formation module 124, a carbon emission value publishing module 126, a workload mover to facility module 128, and an SLA miss carbon credit exchange module 130.

Each of the following components is located in cloud consumer computer 102, cloud service provider computer 104, or another computer (not shown): a workload mover to provider module 132, a carbon credit database 134, an enterprise/user carbon credit exchange module 136, and an artificial intelligence engine 138.

Although not shown in FIG. 1, a software-based first cloud resource consumption control system is executed by cloud consumer computer 102 and includes cloud resource requirements and carbon footprint cap publishing module 108, bid/re-bid preparing and submitting module 110, dynamic sustainability target identifier module 112, and cloud resource finalizing module 114. Although not shown in FIG. 1, a software-based second cloud resource consumption control system is executed by cloud service provider computer 104 and includes cloud resource requirement listener and computation module 116, cloud resource state and future availability assessment module 118, dynamic carbon emission calculator 120, carbon credit calculator and assigner 122, cloud group formation module 124, carbon emission value publishing module 126, workload mover to facility module 128, and SLA miss carbon credit exchange module 130.

Cloud resource requirements and carbon footprint cap publishing module 108 enables the cloud consumer to publish cloud resource requirements of the cloud consumer to platform 106, together with a total carbon footprint cap (i.e., carbon emission cap) that the cloud consumer can afford.

Cloud resource requirement listener and computation module 116 gathers requirements of the cloud consumer (i.e., cloud resource requirements and the carbon footprint cap) that were published in the portal provided by platform 106 and provides a list of cloud resources that satisfy the cloud resource requirements and the carbon footprint cap.

Cloud group formation module 124 forms a group of cloud service providers to serve requests by a single cloud service provider acting as a broker among the group of cloud service providers, including one cloud service provider acting as an aggregator. For example, cloud group formation module 124 forms a team of software-as-a-service (SaaS) and infrastructure-as-a-service (IaaS) providers that ensure a decreased carbon footprint.

Cloud resource state and future availability assessment module 118 is used by a cloud service provider to identify the available resources for a requested duration that satisfy the requirements based on individual and combined carbon footprint caps by analyzing the current and future expected workload (i.e., predicted workload).

Carbon emission value publishing module 126 for each cloud resource is used by the cloud service provider to publish the carbon emission value for the cloud resource based on a historical average emission value for a specified workload (e.g., a reasonable agreed upon workload).

Dynamic carbon emission calculator 120 for cloud resources is used by the cloud service provider to identify and publish the dynamic carbon emission details for each cloud resource at a specific load on the cloud resource (e.g., 25%, 50%, 75%, and 100% loads).

Carbon credit calculator and assigner 122 calculates carbon credit points as (i) the difference between carbon emission on-premises (i.e., previous state) and the current state (i.e., target state) or (ii) the difference between the carbon emission amount associated with the right to emit and the carbon emission amount saved by using actions that favor sustainability targets (i.e., greener options).

In response to the workload mover to facility module 128 determining that the cloud service provider serving a carbon emission target for a workload cannot meet the target within a threshold period, the workload mover to facility module 128 moves the workload to another facility of the same cloud service provider where the target can be met.

In response to the SLA miss carbon credit exchange module 130 determining that the cloud service provider cannot meet the carbon emission target with any of its facilities and misses the agreed upon target, SLA miss carbon credit exchange module 130 offers carbon credit points that can be exchanged with other users of the cloud service provider as compensation.

In response to the bid/re-bid preparing and submitting module 110 determining that the cloud service provider is unable to meet an agreed upon carbon emission target for a specific component or for an entire workload, the bid/re-bid preparing and submitting module 110 prepares a bid again for the entire workload of a specific portion of the workload and publishes in the portal provided by platform 106.

Workload mover to provider module 132 moves the workload from one cloud service provider to another cloud service provider based on a decision made by carbon footprint-based control of cloud resource consumption system 100. If the cloud service provider serving the carbon emission target cannot meet the target for a threshold period, workload mover to provider module 132 moves the workload to another facility of a different cloud service provider where the target is met. Workload mover to provider module 132 selects the different cloud service provider to meet the target depending on the response of the different cloud service provider based on the dynamic re-bid.

If an enterprise target for carbon emission for a workload changes, dynamic sustainability target identifier module 112 uses natural language processing (NLP) techniques and/or manual inputs to dynamically capture new target values from documentations. In response to the dynamic capture of the new target values, bid/re-bid preparing and submitting module 110 prepares or re-prepares a bid according to the new target values.

Cloud resource finalizing module 114 finalizes a selection of cloud service provider(s) to provide the cloud resources to meet the requirements of the cloud consumer.

Carbon credit database 134 keeps track of carbon credit points earned, spent, and exchanged using the aforementioned modules for each user, enterprise, and/or department level.

Enterprise/user carbon credit exchange module 136 provides a platform for users and/or enterprises to exchange carbon credit points.

Artificial intelligence engine 138 is integrated with the aforementioned modules and uses random forest methodology to capture and re-calculate any deviation due to different or unforeseen cloud resource consumption requirements.

The functionality of the components shown in FIG. 1 is described in more detail in the discussion of FIGS. 2A-2B, FIG. 3, FIG. 4, FIG. 5, and FIG. 6 presented below.

Process for Carbon Footprint-Based Control of Cloud Resource Consumption

Figure 2A:
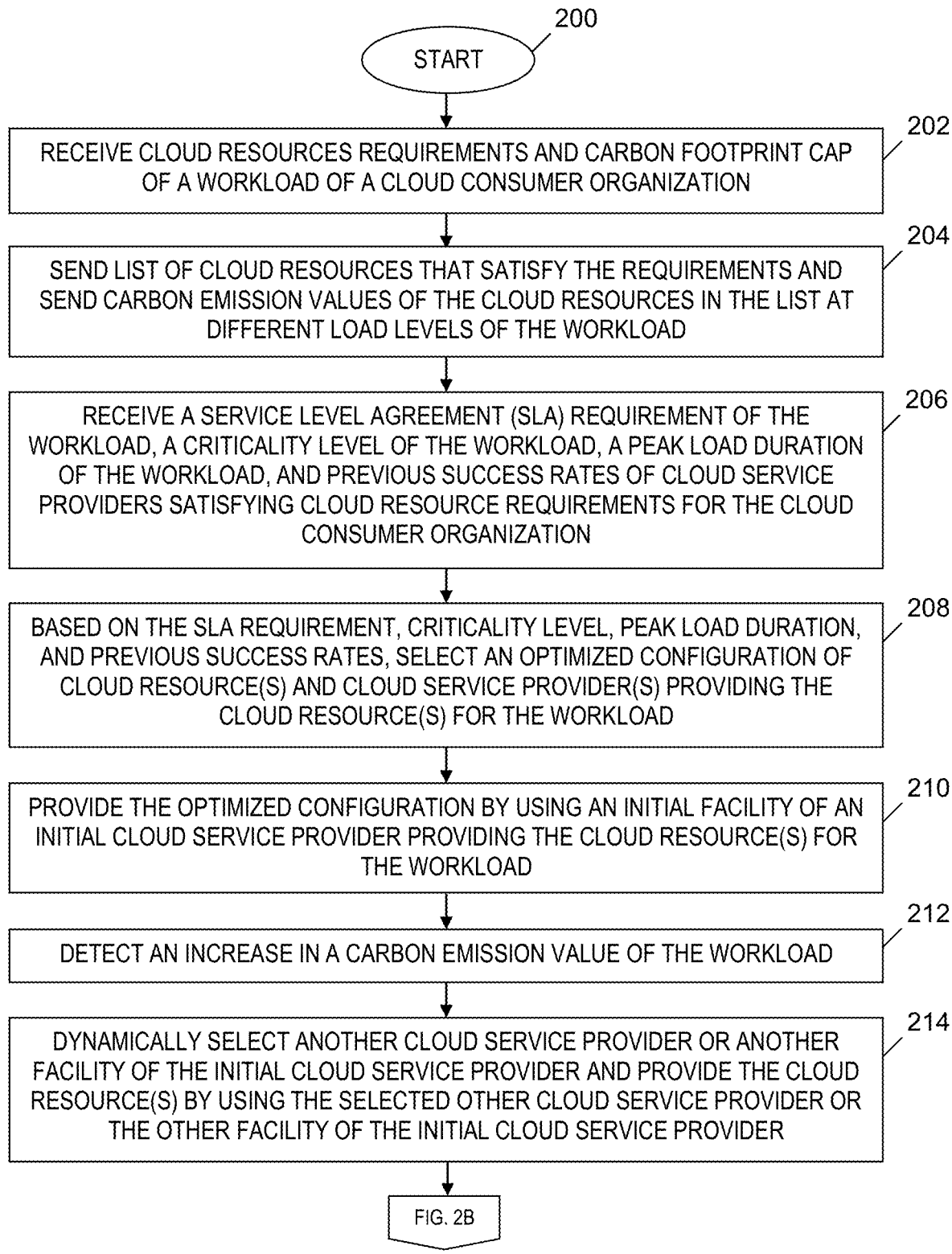
FIGS. 2A-2B depict a flowchart of a process of controlling cloud resource consumption based on carbon footprints of cloud resources, in accordance with embodiments of the present invention.
Figure 2B:
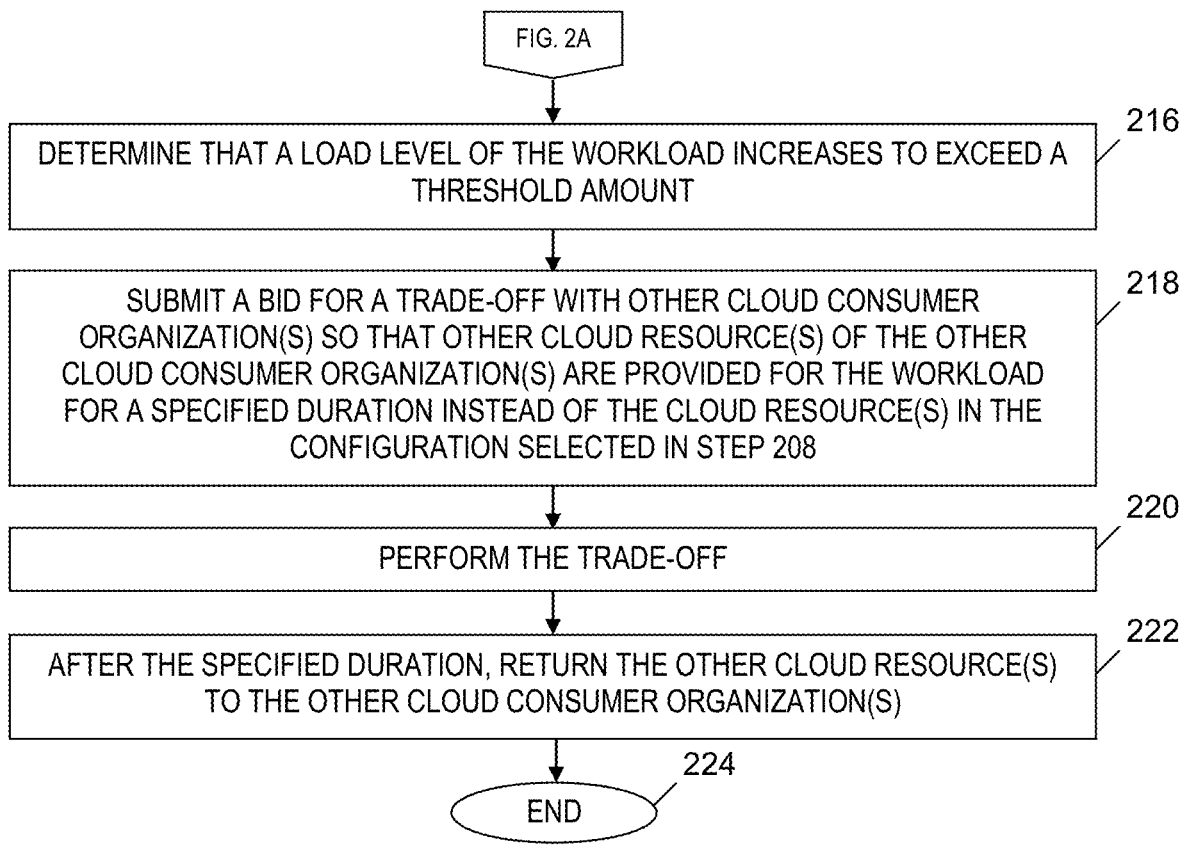

FIGS. 2A-2B depict a flowchart of a process of controlling cloud resource consumption based on carbon footprints of cloud resources, in accordance with embodiments of the present invention. The process of FIGS. 2A-2B begins at a start node 200 in FIG. 2A. Prior to step 202, cloud service provider computer 102 (see FIG. 1) and other cloud service provider computers subscribe to published cloud resources requirements and carbon footprint caps of workloads. Prior to step 202, cloud resources requirements and carbon footprint cap publishing module 108 (see FIG. 1) publishes the cloud resource requirements and the carbon footprint cap of a workload of a cloud consumer organization based on a sustainability target of the cloud consumer organization.

In step 202, in response to cloud service provider computer 104 (see FIG. 1) subscribing to published cloud resources requirements and carbon footprint caps of workloads, cloud resource requirement listener and computation module 116 (see FIG. 1) receives the published cloud resources requirements and the carbon footprint cap of the workload of the cloud consumer organization.

In step 204, cloud resource requirement listener and computation module 116 (see FIG. 1) sends a list of cloud resources satisfying the cloud resources requirements received in step 202 together with the carbon footprint (i.e., estimated carbon emission value) of each of the cloud resources at different load levels (e.g., 25%, 50%, 75%, and 100% load levels of the workload). In one embodiment, step 204 is repeated with one or more other cloud service provider computers sending other list(s) of cloud resources satisfying the cloud resources requirements received in step 202 and carbon footprints of the cloud resources at different load levels.

In step 206, bid/re-bid preparing and submitting module 110 (see FIG. 1) receives an SLA requirement of the workload, a criticality level of the workload, a peak load duration of the workload, and previous success rates of cloud service providers satisfying cloud resource requirements for the cloud consumer organization.

In step 208, based on the SLA requirement of the workload, the criticality level of the workload, the peak load duration of the workload, and the previous success rates of cloud service providers satisfying cloud resource requirements for the cloud consumer organization received in step 206, bid/re-bid preparing and submitting module 110 (see FIG. 1) selects an optimized configuration of cloud resource(s) and cloud service provider(s), where the cloud resource(s) are selected from the list of cloud resources sent in step 204. Also in step 208, bid/re-bid preparing and submitting module 110 (see FIG. 1*ii*) prepares and submits a bid for the optimized configuration of cloud resource(s) via platform 106 (see FIG. 1).

In one embodiment not shown in FIGS. 2A-2B, the process of controlling cloud resource consumption based on carbon footprints of cloud resources ends after step 208. In the embodiment shown in FIGS. 2A-2B, the process of controlling cloud resource consumption based on carbon footprints of cloud resources also includes steps 210 through 222, where the optimized configuration selected in step 208 includes a single cloud service provider as the provider of the cloud resource(s) in the optimized configuration. The single cloud service provider is also referred to in the discussion of FIGS. 2A-2B as the initial cloud service provider.

In step 210, system 100 provides the optimized configuration selected in step 208 by using an initial facility of an initial cloud service provider providing the cloud resource(s) for the workload.

In step 212, dynamic carbon emission calculator 120 (see FIG. 1) detects an increase in a carbon emission value of the workload.

In step 214, in response to the increase in the carbon emission value detected in step 212, workload mover to provider module 132 (see FIG. 1) dynamically selects another cloud service provider and moves the workload so that the selected other cloud service provider provides the cloud resource(s) for the workload.

Alternatively, in step 214, in response to the increase in the carbon emission value detected in step 212, workload mover to facility module 128 (see FIG. 1) dynamically selects another facility of the initial cloud service provider and moves the workload to the selected other facility, so that the other facility provides the cloud resource(s) for the workload.

After step 214, the process of FIGS. 2A-2B continues with step 216 in FIG. 2B. In step 216, bid/re-bid preparing and submitting module 110 (see FIG. 1) determines that a load level of the workload increases to exceed a threshold amount.

In step 218, in response to step 216, bid/re-bid preparing and submitting module 110 (see FIG. 1) submits a bid for a trade-off with other cloud consumer organization(s) so that other cloud resource(s) of the other cloud consumer organization(s) are provided for the workload for a specified duration instead of the cloud resource(s) included in the configuration selected in step 208.

In step 220, system 100 performs the trade-off for which the bid was submitted in step 218.

In step 222, after the specified duration associated with the trade-off, system 100 returns the other cloud resource(s) to the other cloud consumer organization(s), so that the cloud resource(s) included in the configuration selected in step 208 are again provided for the workload by the cloud service provider specified in the configuration selected in step 208.

After step 222, the process of FIGS. 2A-2B ends at an end node 224.

Figure 3:
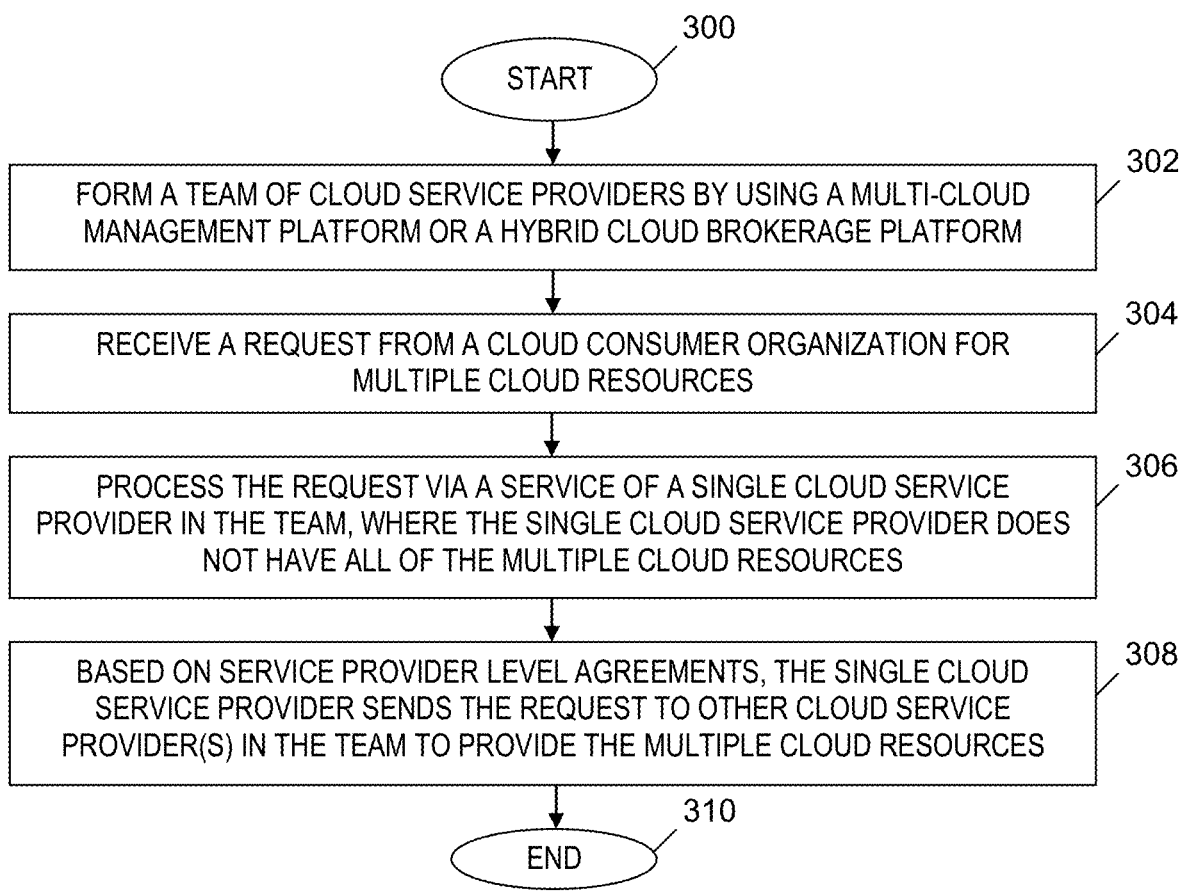
FIG. 3 is a flowchart of a process of forming a team of cloud service providers to manage cloud resource consumption within the process of FIGS. 2A-2B, in accordance with embodiments of the present invention.

FIG. 3 is a flowchart of a process of forming a team of cloud service providers to manage cloud resource consumption within the process of FIGS. 2A-2B, in accordance with embodiments of the present invention. The process of FIG. 3 begins at a start node 300. In the process of FIG. 3, platform 106 (see FIG. 1) includes a multi-cloud management platform (MCMP) or a hybrid cloud brokerage platform. In step 302, platform 106 (see FIG. 1) forms a team of cloud service providers by using the MCMP or the hybrid cloud brokerage platform.

In step 304, a single cloud service provider receives a request from a cloud consumer organization for multiple cloud resources for the workload. The request is received via the cloud resource consumption control system in cloud consumer computer 102 (see FIG. 1).

In step 306, a service of the single cloud service provider initiates processing of the request for the multiple cloud resources, even though the single cloud service provider does not have custody of all of the requested multiple cloud resources.

In step 308, based on service provider level agreements, the single cloud service provider sends the request to other cloud service provider(s) in the team formed in step 302, which requests that the other cloud service provider(s) provide the multiple cloud resources. If the single cloud service provider can provide one or more (but not all) of the requested multiple cloud resources, then the request sent to the other cloud service provider(s) requests that the other cloud service provider(s) provide the cloud resource(s) included in the multiple cloud resources that cannot be provided by the single cloud service provider.

After step 308, the other cloud service provider(s) or the single cloud service provider together with the other cloud service provider(s) provide the multiple cloud resources for the workload. The process of FIG. 3 ends at an end node 310.

Figure 4:
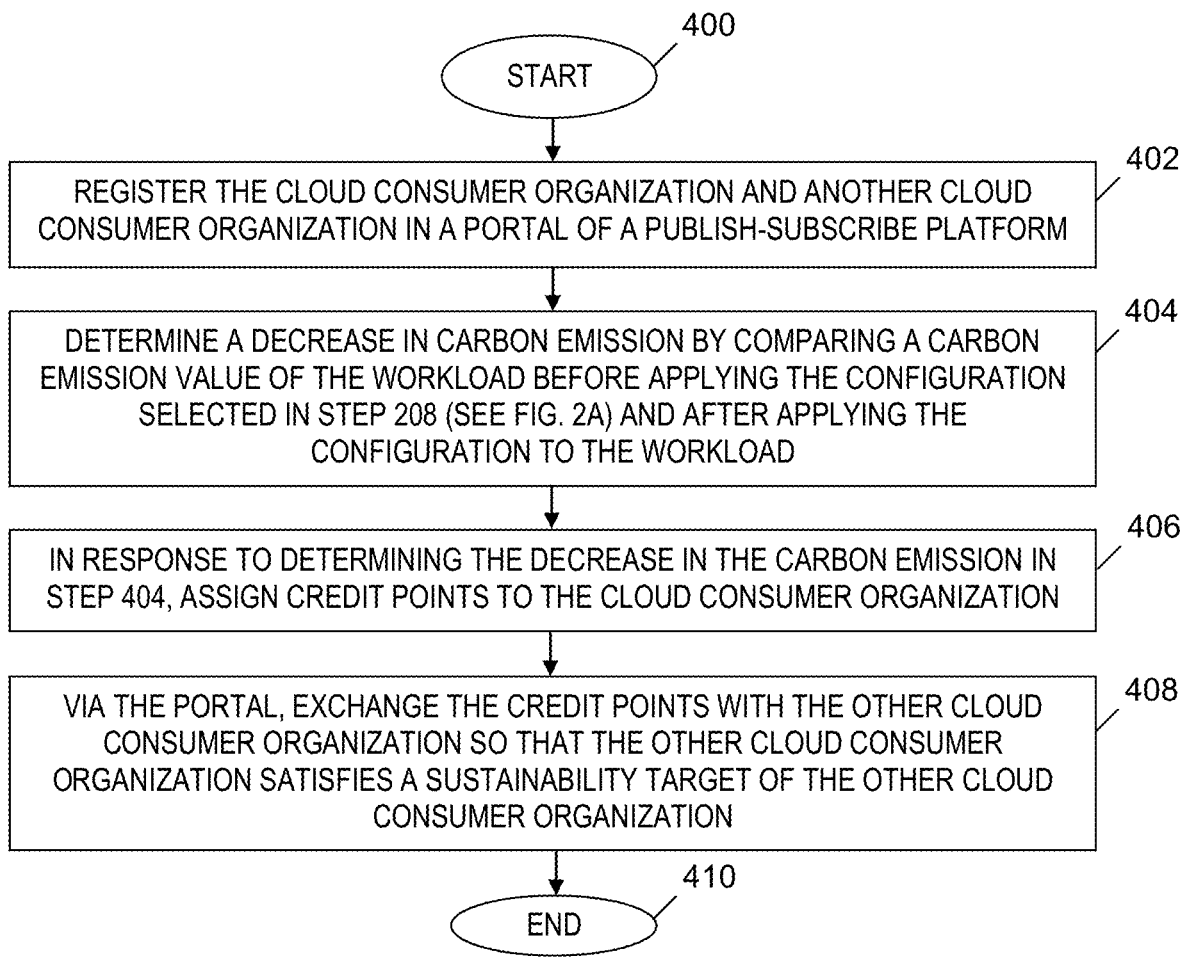
FIG. 4 is a flowchart of a process of using credit points to manage cloud resource consumption within the process of FIGS. 2A-2B, in accordance with embodiments of the present invention.

FIG. 4 is a flowchart of a process of using credit points to manage cloud resource consumption within the process of FIGS. 2A-2B, in accordance with embodiments of the present invention. The process of FIG. 4 begins at a start node 400. In the process of FIG. 4, platform 106 (see FIG. 1) includes a publish-subscribe platform. In step 402, platform 106 (see FIG. 1) registers the cloud consumer organization and another cloud consumer organization in a portal of the publish-subscribe platform.

In step 404, carbon credit calculator and assigner 122 (see FIG. 1) determines a decrease in carbon emission for the workload by comparing a carbon emission value of the workload before applying the configuration selected in step 208 (see FIG. 2A) and after applying the configuration to the workload.

In step 406, in response to determining the decrease in carbon emission in step 404, carbon credit calculator and assigner 122 (see FIG. 1) assigns carbon credit points to the cloud consumer organization.

In step 408, via the portal of the publish-subscribe platform, enterprise/user carbon credit exchange module 136 (see FIG. 1) exchanges the carbon credit points with the other cloud consumer organization so that the other cloud consumer organization satisfies a sustainability target of the other cloud consumer organization.

After step 408, the process of FIG. 4 ends at an end node 410.

Figure 5:
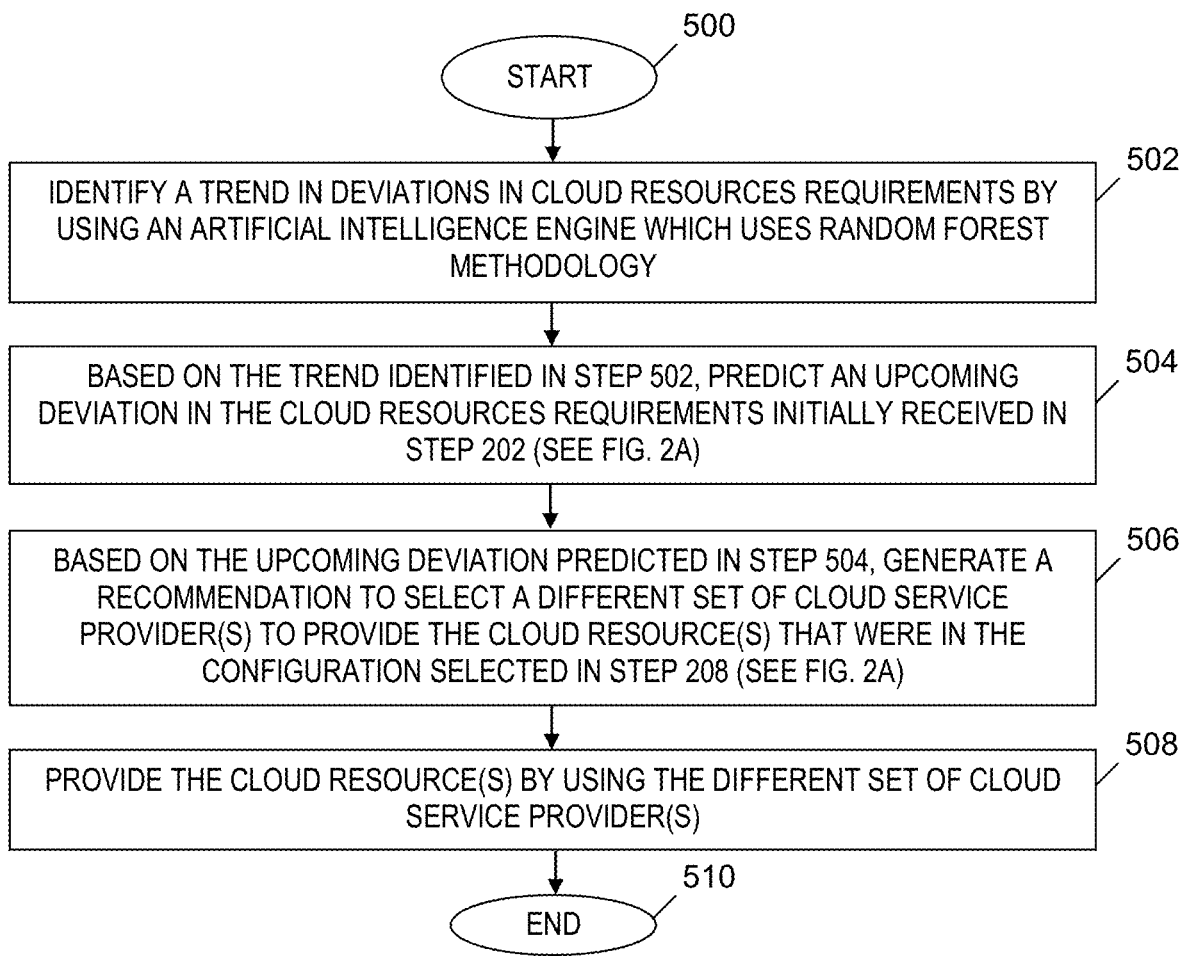
FIG. 5 is a flowchart of a process of using an artificial intelligence engine to manage cloud resource consumption within the process of FIGS. 2A-2B, in accordance with embodiments of the present invention.

FIG. 5 is a flowchart of a process of using an artificial intelligence engine to manage cloud resource consumption within the process of FIGS. 2A-2B, in accordance with embodiments of the present invention. The process of FIG. 5 begins at a start node 500. In step 502, system 100 (see FIG. 1) identifies a trend in deviations in cloud resources requirements by using artificial intelligence engine 138 (see FIG. 1), which uses random forest methodology.

In step 504, based on the trend identified in step 502, artificial intelligence engine 138 (see FIG. 1) predicts an upcoming deviation in the cloud resources requirements initially received in step 202 (see FIG. 2A).

In step 506, based on the upcoming deviation predicted in step 504, artificial intelligence engine 138 (see FIG. 1) generates a recommendation to select a different set of cloud service provider(s) to provide the cloud resource(s) that were in the configuration selected in step 208 (see FIG. 2A).

In step 508, system 100 selects the different set of cloud service provider(s) in accordance with the recommendation generated in step 506 and provides the cloud resource(s) by using the selected different set of cloud service provider(s).

After step 508, the process of FIG. 5 ends at an end node 510.

Computer System

Figure 6:
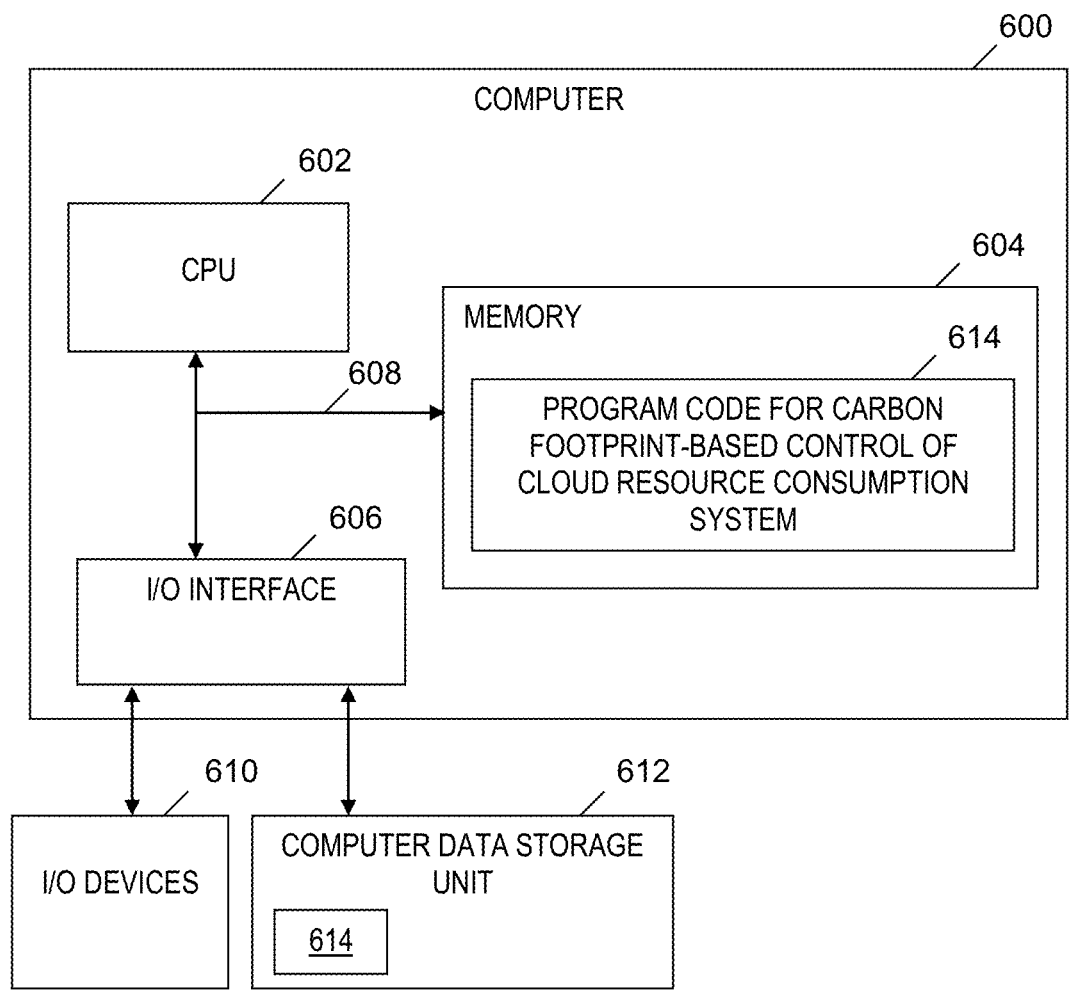
FIG. 6 is a block diagram of a computer that is included in the system of FIG. 1 and that implements the processes of FIGS. 2A-2B, FIG. 3, FIG. 4, and FIG. 5, in accordance with embodiments of the present invention.

FIG. 6 is a block diagram of a computer that is included in the system of FIG. 1 and that implements the processes of FIGS. 2A-2B, FIG. 3, FIG. 4, and FIG. 5, in accordance with embodiments of the present invention. Computer 600 is a computer system that generally includes a central processing unit (CPU) 602, a memory 604, an input/output (I/O) interface 606, and a bus 608. In one embodiment, computer 600 is cloud consumer computer 102 (see FIG. 1) and functionality of components of computer 600 are identical to functionality of analogous components (not shown) that are included in cloud service provider computer 104. Further, computer 600 is coupled to I/O devices 610 and a computer data storage unit 612. CPU 602 performs computation and control functions of computer 600, including executing instructions included in program code 614 for carbon footprint-based control of cloud resource consumption system 100 (see FIG. 1) to perform a method of controlling cloud resource consumption based on carbon footprints of cloud resources, where the instructions are executed by CPU 602 via memory 604. CPU 602 may include a single processing unit or processor or be distributed across one or more processing units or one or more processors in one or more locations (e.g., on a client and server).

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems or a plurality of computer readable storage media in various forms. Further, memory 604 can include data distributed across, for example, a local area network (LAN) or a wide area network (WAN).

I/O interface 606 includes any system for exchanging information to or from an external source. I/O devices 610 include any known type of external device, including a display, keyboard, etc. Bus 608 provides a communication link between each of the components in computer 600, and may include any type of transmission link, including electrical, optical, wireless, etc.

I/O interface 606 also allows computer 600 to store information (e.g., data or program instructions such as program code 614) on and retrieve the information from computer data storage unit 612 or another computer data storage unit (not shown). Computer data storage unit 612 includes one or more known computer readable storage media, where a computer readable storage medium is described below. In one embodiment, computer data storage unit 612 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 604 and/or storage unit 612 may store computer program code 614 that includes instructions that are executed by CPU 602 via memory 604 to control cloud resource consumption based on carbon footprints of cloud resources. Although FIG. 6 depicts memory 604 as including program code, the present invention contemplates embodiments in which memory 604 does not include all of code 614 simultaneously, but instead at one time includes only a portion of code 614.

Further, memory 604 may include an operating system (not shown) and may include other systems not shown in FIG. 6.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to controlling cloud resource consumption based on carbon footprints of cloud resources. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 600) including one or more processors (e.g., CPU 602), wherein the processor(s) carry out instructions contained in the code causing the computer system to control cloud resource consumption based on carbon footprints of cloud resources. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of controlling cloud resource consumption based on carbon footprints of cloud resources.

While it is understood that program code 614 for controlling cloud resource consumption based on carbon footprints of cloud resources may be deployed by manually loading directly in client, server and proxy computers (not shown) via loading a computer-readable storage medium (e.g., computer data storage unit 612), program code 614 may also be automatically or semi-automatically deployed into computer 600 by sending program code 614 to a central server or a group of central servers. Program code 614 is then downloaded into client computers (e.g., computer 600) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider can offer to create, maintain, support, etc. a process of controlling cloud resource consumption based on carbon footprints of cloud resources. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 604 and computer data storage unit 612) having computer readable program instructions 614 thereon for causing a processor (e.g., CPU 602) to carry out aspects of the present invention.

The computer readable storage medium can be a tangible device that can retain and store instructions (e.g., program code 614) for use by an instruction execution device (e.g., computer 600). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 600) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B, FIG. 3, FIG. 4, and FIG. 5) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 600) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g. computer 600), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may some-times be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
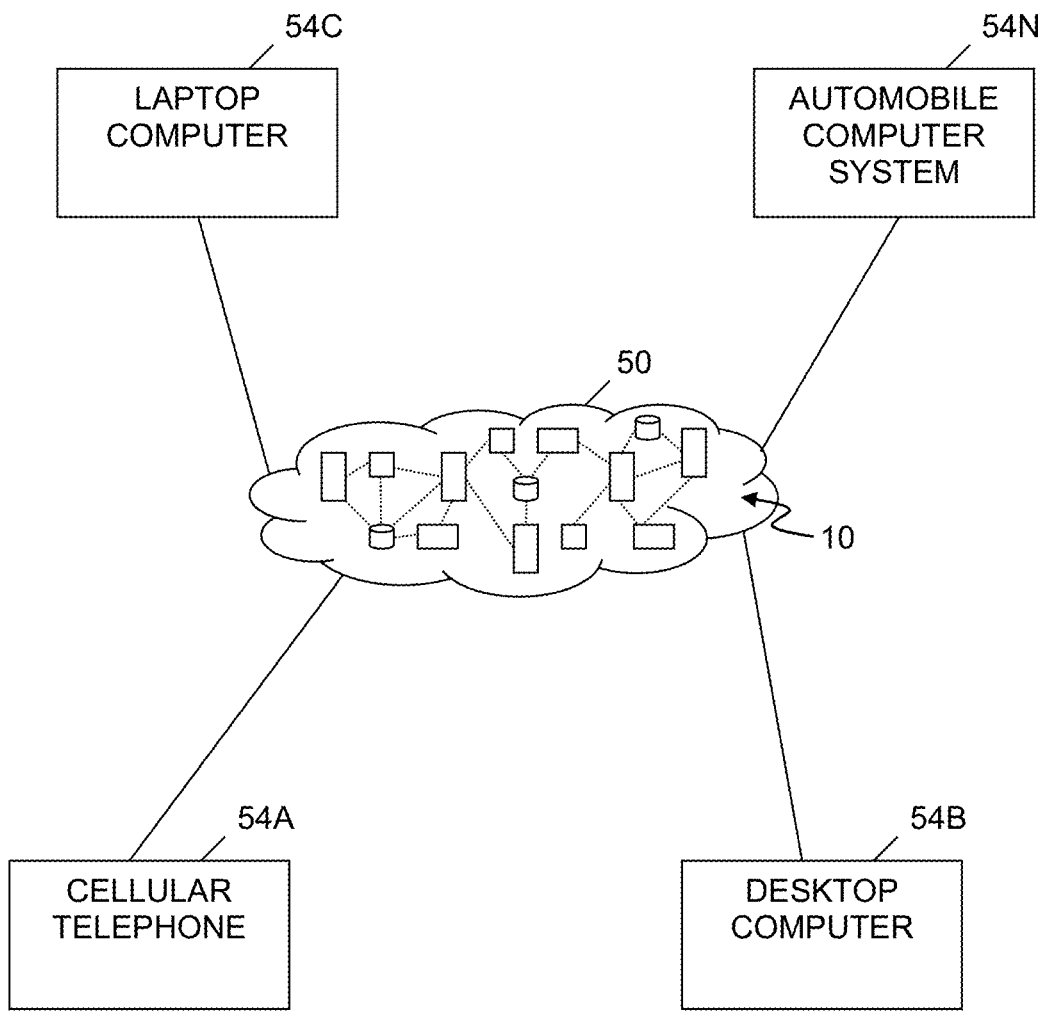
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
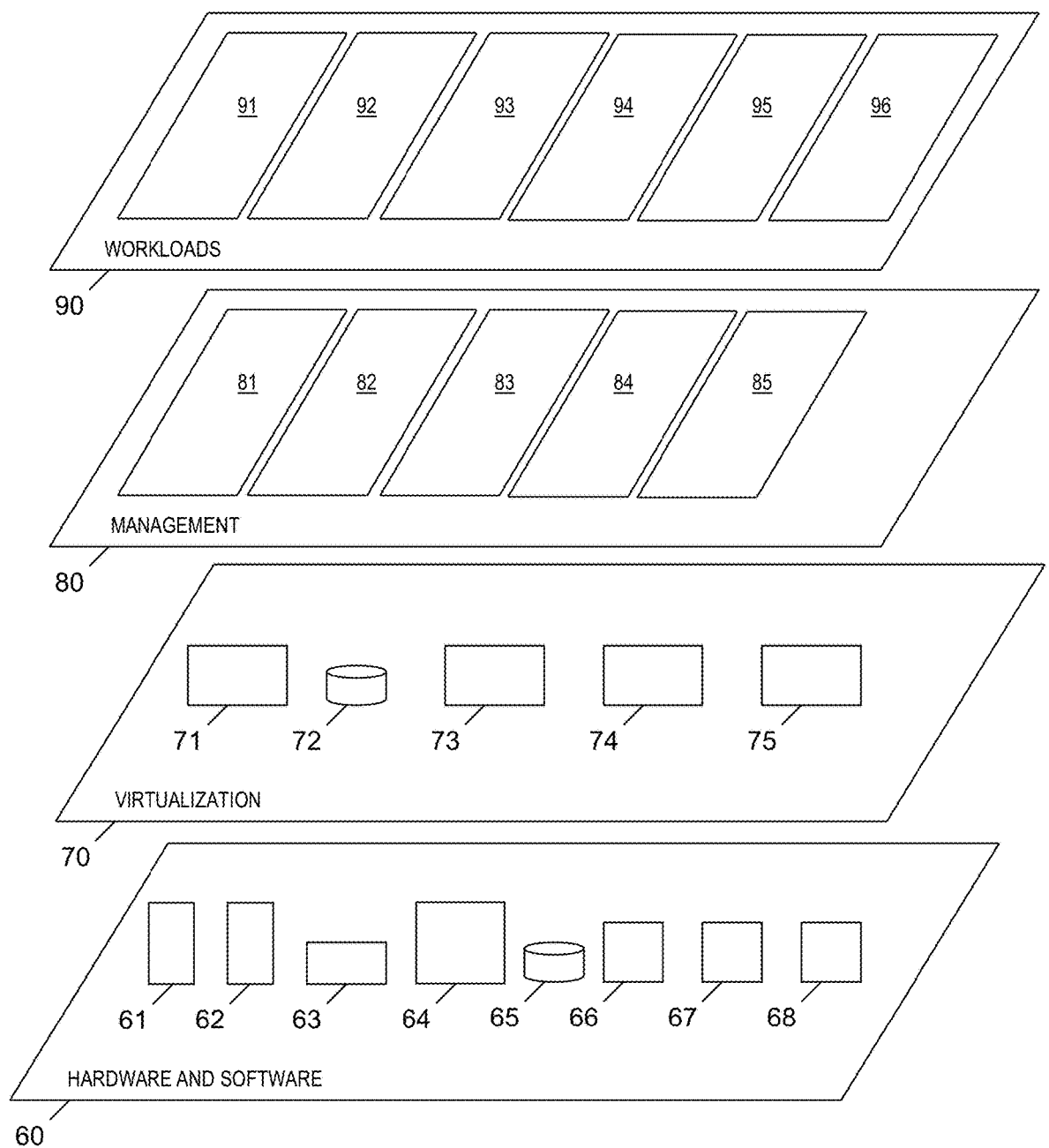
FIG. 8 depicts abstraction model layers, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and carbon footprint-based control of cloud resource consumption 96.

What is claimed is:

1. A computer system comprising:
 a central processing unit (CPU) that, when executing instructions stored in an associated memory, is configured to:
  register a cloud consumer organization in a portal of a publish-subscribe platform;
  receive, by a cloud service provider, a request for cloud resources from the cloud consumer organization, wherein the cloud service provider does not have custody of all of the cloud resources that have been requested, and wherein the request comprises requirements of the cloud resources and a carbon footprint cap of a workload of the cloud consumer organization;
  receive a service level agreement (SLA) requirement of the workload, a criticality level of the workload, a peak load duration of the workload, and previous success rates of cloud service providers satisfying cloud resource requirements for the cloud consumer organization;
  based on the SLA requirement, the criticality level, the peak load duration, and the previous success rates, select an optimized configuration of one or more cloud resources from a list of cloud resources that satisfy the requirements of the cloud resources and the requirements of the carbon footprint cap, wherein the one or more cloud resources that are selected from the list do not exceed the carbon footprint cap at a given load level based on an initial facility of the cloud service provider;
  submit a bid to the publish-subscribe platform to use an initial cloud service provider and the initial facility to provide the one or more cloud resources;
  determine that a load level of the workload has increased to exceed a threshold amount;
  in response to the load level of the workload being determined to exceed the threshold amount, submit a bid for a trade-off with one or more other cloud consumer organizations that are in custody of one or more other cloud resources, wherein the trade-off includes trading the one or more of the cloud resources in the selected optimized configuration;
  perform the trade-off with the one or more other cloud consumer organizations;
  after the peak load duration, return the one or more of the cloud resources to the one or more other cloud consumer organizations;
  detect an increase in a carbon emission value of the workload;
  determine that the increased carbon emission value of the workload exceeds the carbon footprint cap measured in CO2e units for the cloud consumer organization;
  dynamically select another cloud service provider and automatically submit a re-bid to the publish-subscribe platform; and
  in response to the determination that the increased carbon emission value of the workload exceeds the carbon footprint cap for the cloud consumer organization, dynamically switch to the another cloud service provider to provide the one or more of the cloud resources for the workload, so that a new carbon emission value of the workload using the another cloud service provider does not exceed the carbon footprint cap for the cloud consumer organization.

2. The computer system of claim 1, wherein the CPU is further configured to:
 provide the optimized configuration by the initial facility of the initial cloud service provider that provides the one or more of the cloud resources for the workload, the registering comprising receiving for the cloud consumer organization cloud resources requirements and carbon footprint caps for a plurality of workloads.

3. The computer system of claim 2, wherein the requirements of the cloud resources and the carbon footprint caps are published to the publish-subscribe platform.

4. The computer system of claim 1, wherein the CPU is further configured to:
 form a team of cloud service providers, which comprises the cloud service provider and one or more other cloud service providers, using a multi-cloud management platform or a hybrid cloud brokerage platform;

receive a request from the cloud consumer organization for multiple cloud resources; and process the request via a service of the cloud service provider, wherein, when processing the request, the service is configured to:

send the request to the one or more other cloud service providers based on service-provider level agreements between the cloud service provider and the one or more other cloud service providers to request that the one or more other cloud service providers provide the one or more of the cloud resources.

5. The computer system of claim 1, wherein the processor is further configured to:

register another cloud consumer organization in the portal of a publish-subscribe platform;

determine a decrease in carbon emissions based on a comparison of a carbon emission value of the workload before applying the optimized configuration to the workload and after applying the optimized configuration to the workload;

based on the decrease in the carbon emissions, assign credit points to the cloud consumer organization; and exchange, via the portal, the credit points with the other cloud consumer organization so that the other cloud consumer organization satisfies a sustainability target of the other cloud consumer organization.

6. The computer system of claim 1, wherein the CPU is further configured to:

identify a trend in deviations in the requirements of cloud resources based on an artificial intelligence engine comprising a random forest methodology;

based on the trend, predict a deviation in the requirements of the cloud resources; and based on the predicted deviation, generate a recommendation for a selection of a different one or more cloud service providers to provide the one or more cloud resources for the workload.

7. A computer program product comprising a non-transitory computer-readable storage medium storing instructions that, when executed by a processor, cause the processor to perform:

registering a cloud consumer organization in a portal of a publish-subscribe platform;

receiving a request for cloud resources from the cloud consumer organization by a cloud service provider that does not have custody of all of the cloud resources that have been requested, wherein the request comprises requirements of the cloud resources and a carbon footprint cap of a workload of the cloud consumer organization;

in response to the receiving the requirements of the cloud resources and the requirements of the carbon footprint cap, sending a list of cloud resources that satisfy the requirements of the cloud resources and the carbon footprint cap and sending carbon emission values of the cloud resources in the list at different load levels of the workload;

receiving a service level agreement (SLA) requirement of the workload, a criticality level of the workload, a peak load duration of the workload, and previous success rates of cloud service providers satisfying cloud resource requirements for the cloud consumer organization;

based on the SLA requirement, the criticality level, the peak load duration, and the previous success rates, selecting an optimized configuration of one or more of the cloud resources in the list that does not exceed the carbon footprint cap at a given load level based on an initial facility of the cloud service provider;

submitting a bid to the publish-subscribe platform to use an initial cloud service provider and the initial facility to provide the one or more cloud resources;

determining that a load level of the workload has increased to exceed a threshold amount;

in response to the determining that the load level of the workload exceeds the threshold amount, submitting a bid for a trade-off with one or more other cloud consumer organizations that are in custody of one or more other cloud resources, wherein the trade-off includes trading the one or more of the cloud resources in the selected optimized configuration:

performing the trade-off with the one or more other cloud consumer organizations;

after the peak load duration, returning the one or more of the cloud resources to the one or more other cloud consumer organizations;

detecting an increase in a carbon emission value of the workload;

determining that the increased carbon emission value of the workload exceeds the carbon footprint cap measured in CO2e units for the cloud consumer organization;

dynamically selecting another cloud service provider and automatically submitting a re-bid to the publish-subscribe platform; and in response to the determination that the increased carbon emission value of the workload exceeds the carbon footprint cap for the cloud consumer organization, dynamically switching to the another cloud service provider to provide the one or more of the cloud resources for the workload, so that a new carbon emission value of the workload using the another cloud service provider does not exceed the carbon footprint cap for the cloud consumer organization.

8. The computer program product of claim 7, wherein the instructions further cause the processor to perform:

providing the optimized configuration using the initial facility of the initial cloud service provider that provides the one or more cloud resources for the workload.

9. The computer program product of claim 8, wherein the requirements of the cloud resources and the carbon footprint cap are published to the publish-subscribe platform.

10. The computer program product of claim 7, wherein the instructions further cause the processor to perform:

forming the team of cloud service providers, which comprises the cloud service provider and one or more other cloud service providers, using a multi-cloud management platform or a hybrid cloud brokerage platform;

receiving a request from the cloud consumer organization for multiple cloud resources; and processing the request via a service of the cloud service provider, wherein, when processing the request, the service is configured to perform:

sending the request to the one or more other cloud service providers based on service provider level agreements between the cloud service provider and the one or more other cloud service providers to request that the one or more other cloud service providers provide the one or more of the cloud resources.

11. The computer program product of claim 7, wherein the instructions further cause the processor to perform:

registering another cloud consumer organization in the portal of a publish-subscribe platform;

determining a decrease in carbon emissions based on a comparison of a carbon emission value of the workload before applying the optimized configuration to the workload and after applying the optimized configuration to the workload;

based on the decrease in the carbon emissions, assigning credit points to the cloud consumer organization; and exchanging, via the portal, the credit points with the other cloud consumer organization so that the other cloud consumer organization satisfies a sustainability target of the other cloud consumer organization.

12. The computer program product of claim 7, wherein the instructions further cause the processor to perform:

identifying a trend in deviations in the requirements of cloud resources based on an artificial intelligence engine comprising a random forest methodology;

based on the identified trend, predicting a deviation in the requirements of the cloud resources; and based on the predicted deviation, generating a recommendation for a selection of a different one or more cloud service providers to provide the one or more cloud resources for the workload.

13. A computer-implemented method comprising:

registering, by one or more processors, a cloud consumer organization in a portal of a publish-subscribe platform;

receiving, by the one or more processors, a request for cloud resources from the cloud consumer organization by a cloud service provider that does not have custody of all of the cloud resources that have been requested, wherein the request comprises requirements of the cloud resources and a carbon footprint cap of a workload of the cloud consumer organization;

in response to the receiving the requirements of the cloud resources and the requirements of the carbon footprint cap, sending, by the one or more processors, a list of cloud resources that satisfy the requirements of the cloud resources and the carbon footprint cap, and sending carbon emission values of the cloud resources in the list at different load levels of the workload;

receiving, by the one or more processors, a service level agreement (SLA) requirement of the workload, a criticality level of the workload, a peak load duration of the workload, and previous success rates of cloud service providers satisfying cloud resource requirements for the cloud consumer organization;

based on the SLA requirement, the criticality level, the peak load duration, and the previous success rates, selecting, by the one or more processors, an optimized configuration of one or more of the cloud resources in the list that does not exceed the carbon footprint cap at a given load level based on an initial facility of the cloud service provider;

submit a bid to the publish-subscribe platform to use an initial cloud service provider and the initial facility to provide the one or more cloud resources;

determining, by the one or more processors, that a load level of the workload has increased to exceed a threshold amount;

in response to the determining that the load level of the workload exceeds the threshold amount, submitting, by the one or more processors, a bid for a trade-off with one or more other cloud consumer organizations that are in custody of one or more other cloud resources, wherein the trade-off includes trading the one or more of the cloud resources in the selected optimized configuration;

performing, by the one or more processors, the trade-off with the one or more other cloud consumer organizations;

after the peak load duration, returning, by the one or more processors, the one or more of the cloud resources to the one or more other cloud consumer organizations;

detecting an increase in a carbon emission value of the workload;

determining that the increased carbon emission value of the workload exceeds the carbon footprint cap measured in CO2e units for the cloud consumer organization;

dynamically selecting, by the one or more processors, another cloud service provider and automatically submitting a re-bid to the publish-subscribe platform; and in response to the determination that the increased carbon emission value of the workload exceeds the carbon footprint cap for the cloud consumer organization, dynamically switching to the another cloud service provider to provide the one or more of the cloud resources for the workload, so that a new carbon emission value of the workload using the another cloud service provider does not exceed the carbon footprint cap for the cloud consumer organization.

14. The method of claim 13, further comprising:

providing, by the one or more processors, the optimized configuration using the initial facility of the initial cloud service provider that provides the one or more cloud resources for the workload.

15. The method of claim 14, wherein the requirements of the cloud resources and the carbon footprint cap are published to the publish-subscribe platform.

16. The method of claim 13, further comprising:

forming, by the one or more processors, the team of cloud service providers, which comprises the cloud service provider and one or more other cloud service providers, using a multi-cloud management platform or a hybrid cloud brokerage platform;

receiving, by the one or more processors, a request from the cloud consumer organization for multiple cloud resources; and processing the request via a service of the cloud service provider, wherein, when processing the request, the method further comprises:

sending the request by the service to the one or more other cloud service providers based on service provider level agreements between the cloud service provider and the one or more other cloud service providers to request that the one or more other cloud service providers provide the one or more of the cloud resources.

17. The method of claim 13, further comprising:

registering, by the one or more processors, another cloud consumer organization in the portal of the publish-subscribe platform;

determining, by the one or more processors, a decrease in carbon emissions based on a comparison of a carbon emission value of the workload before applying the optimized configuration to the workload and after applying the optimized configuration to the workload;

based on the decrease in the carbon emissions, assigning, by the one or more processors, credit points to the cloud consumer organization; and exchanging, by the one or more processors, the credit points with the other cloud consumer organization via the portal so that the other cloud consumer organization satisfies a sustainability target of the other cloud consumer organization.

\* \* \* \* \*